(12) United States Patent
Hajati

(10) Patent No.: US 10,671,167 B2
(45) Date of Patent: Jun. 2, 2020

(54) ELECTRONIC DEVICE INCLUDING SENSED LOCATION BASED DRIVING OF HAPTIC ACTUATORS AND RELATED METHODS

(71) Applicant: Apple Inc., Cupertino, CA (US)

(72) Inventor: Arman Hajati, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/659,291

(22) Filed: Jul. 25, 2017

(65) Prior Publication Data

US 2018/0059792 A1 Mar. 1, 2018

Related U.S. Application Data

(60) Provisional application No. 62/382,338, filed on Sep. 1, 2016.

(51) Int. Cl.
| | |
|---|---|
| *G06F 3/01* | (2006.01) |
| *G06F 3/041* | (2006.01) |
| *G06F 3/0488* | (2013.01) |
| *G08B 6/00* | (2006.01) |

(52) U.S. Cl.
CPC .............. *G06F 3/016* (2013.01); *G06F 3/041* (2013.01); *G06F 3/04886* (2013.01); *G08B 6/00* (2013.01); *G06F 2203/014* (2013.01)

(58) Field of Classification Search
None
See application file for complete search history.

(56) References Cited

U.S. PATENT DOCUMENTS

| | | |
|---|---|---|
| 7,182,691 B1 | 2/2007 | Schena |
| 7,979,797 B2 | 7/2011 | Schena |
| 8,169,402 B2 | 5/2012 | Shahoian et al. |
| 8,884,927 B1 | 11/2014 | Cheatham, III et al. |
| 89,811,692 | 3/2015 | Simili |
| 9,207,764 B2 | 12/2015 | Birnbaum et al. |
| 2009/0303175 A1 | 12/2009 | Koivunen |

(Continued)

FOREIGN PATENT DOCUMENTS

| | | |
|---|---|---|
| CN | 105247449 | 1/2016 |
| JP | 2005276089 | 10/2005 |

(Continued)

OTHER PUBLICATIONS

Product Specification Sheet: GEEPLUS, VIBRO1 Vibration Actuator, 2 pages, www.geeplus.biz, downloaded on Jul. 15, 2015.

(Continued)

*Primary Examiner* — Benjamin C Lee
*Assistant Examiner* — Krishna P Neupane
(74) *Attorney, Agent, or Firm* — Allen, Dyer, Doppelt + Gilchrist, P.A.

(57) ABSTRACT

An electronic device may include a device housing, a touch display carried by the device housing and configured to sense a user input at a location thereon, and haptic actuators spaced apart within the device housing. The electronic device may also include a controller coupled to the touch display and the haptic actuators. The controller may be configured to cooperate with the touch display to determine a sensed location of the user input on the touch display, and drive the haptic actuators to focus a haptic sensation at the sensed location on the touch display.

21 Claims, 17 Drawing Sheets

(56) References Cited

U.S. PATENT DOCUMENTS

| | | | |
|---|---|---|---|
| 2010/0328229 A1* | 12/2010 | Weber | G06F 1/1626 345/173 |
| 2011/0012717 A1* | 1/2011 | Pance | G06F 3/016 340/407.2 |
| 2011/0148608 A1 | 6/2011 | Grant et al. | |
| 2012/0206371 A1 | 8/2012 | Turunen et al. | |
| 2012/0232780 A1 | 9/2012 | Delson et al. | |
| 2012/0249474 A1 | 10/2012 | Pratt et al. | |
| 2012/0262404 A1* | 10/2012 | Yamamoto | G06F 3/016 345/173 |
| 2013/0055170 A1* | 2/2013 | Langlois | G06F 1/1626 715/863 |
| 2013/0127755 A1 | 5/2013 | Lynn et al. | |
| 2013/0293494 A1* | 11/2013 | Reshef | G06F 3/016 345/173 |
| 2013/0321299 A1 | 12/2013 | Kim et al. | |
| 2014/0197936 A1 | 7/2014 | Biggs et al. | |
| 2014/0265650 A1* | 9/2014 | Jeon | H02K 33/16 310/25 |
| 2015/0005942 A1* | 1/2015 | Inaba | B25J 13/025 700/264 |
| 2015/0077324 A1 | 3/2015 | Birnbaum et al. | |
| 2015/0077373 A1 | 3/2015 | Pance et al. | |
| 2015/0081110 A1* | 3/2015 | Houston | G05D 19/02 700/280 |
| 2015/0109223 A1 | 4/2015 | Kessler et al. | |
| 2015/0116205 A1 | 4/2015 | Westerman et al. | |
| 2015/0123775 A1 | 5/2015 | Kerdemelidis | |
| 2015/0130730 A1 | 5/2015 | Harley et al. | |
| 2016/0085308 A1 | 3/2016 | Birnbaum et al. | |
| 2016/0162025 A1* | 6/2016 | Shah | G06F 3/016 345/156 |

FOREIGN PATENT DOCUMENTS

| | | |
|---|---|---|
| JP | 2010015514 | 1/2010 |
| JP | 2015112013 | 6/2015 |
| TW | M413168 | 10/2011 |
| TW | M507019 | 8/2015 |
| WO | 2013169299 A1 | 11/2013 |
| WO | 2013169303 A1 | 11/2013 |
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

OTHER PUBLICATIONS

Hajati et al., U.S. Appl. No. 15/096,379, filed Apr. 12, 2016.
Baer et al. U.S. Appl. No. 62/347,760, filed Jun. 9, 2016.

* cited by examiner

ELECTRONIC DEVICE INCLUDING SENSED LOCATION BASED DRIVING OF HAPTIC ACTUATORS AND RELATED METHODS

RELATED APPLICATION

The present application claims the priority benefit of provisional application Ser. No. 62/382,338 filed on Sep. 1, 2016, the entire contents of which are herein incorporated in its entirety by reference.

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

An electronic device may include a device housing, a touch display carried by the device housing and configured to sense a user input at a location thereon, and a plurality of haptic actuators spaced apart within the device housing. The electronic device may also include a controller coupled to the touch display and the plurality of haptic actuators. The controller may be configured to cooperate with the touch display to determine a sensed location of the user input on the touch display, and drive the plurality of haptic actuators to focus a haptic sensation at the sensed location on the touch display.

The touch display may be configured to sense an amount of force corresponding to the input at the sensed location. The controller may be configured to drive the plurality of haptic actuators based upon the sensed amount of force at the sensed location, for example.

The controller may be configured to drive each of the plurality of haptic actuators with a respective one of a plurality of different waveforms. The plurality of haptic actuators may include a pair of opposing haptic actuators, for example.

The plurality of haptic actuators may be carried along a periphery of the device housing, for example. The controller may be configured to drive the plurality of haptic actuators with different phase waveforms.

The controller may be configured to drive the plurality of haptic actuators with different amplitude waveforms. The controller may be configured to drive the plurality of haptic actuators with a same waveform, for example.

The controller may be configured to sense at least one of a drive voltage and current and drive the plurality of haptic actuators based thereon. Each of the plurality of haptic actuators may include a haptic actuator housing, a field member movable with the haptic actuator housing, and a coil cooperating with the field member, for example.

A method aspect is directed to a method of driving a plurality of haptic actuators spaced apart within a device housing of an electronic device that includes a touch display carried by the device housing and configured to sense a user input at a location thereon. The method may include using a controller coupled to the touch display and the plurality of haptic actuators to cooperate with the touch display to determine a sensed location of the user input on the touch display, and drive the plurality of haptic actuators to focus a haptic sensation at the sensed location on the touch display.

Another aspect is directed to an electronic device that may include a device housing, a display carried by the device housing, and a plurality of haptic actuators spaced apart within the device housing. The electronic device may also include a controller coupled to the display and the plurality of haptic actuators. The controller may be configured to cooperate with the display to determine a location of at least one object displayed on the display, and drive the plurality of haptic actuators to focus a haptic sensation at the location of the at least one object on the display.

Another aspect is directed to an electronic device that includes a device housing, a plurality of audio output transducers carried by the housing, and a plurality of haptic actuators spaced apart within the device housing. The electronic device also includes a controller coupled to the plurality of audio output transducers and the plurality of haptic actuators. The controller may be configured to cooperate with the plurality of audio output transducers to determine a location of audio output focus, and drive the plurality of haptic actuators to focus a haptic sensation at the location of audio output focus.

Another aspect is directed an electronic device that may include a device housing, wireless communications circuitry carried by the device housing, and a plurality of haptic actuators spaced apart within the device housing. The electronic device may also include a controller coupled to the wireless communications circuitry and the plurality of haptic actuators. The controller may be configured to cooperate with the wireless communications circuitry to receive a notification, and drive the plurality of haptic actuators to focus a haptic sensation based upon the notification.

Another aspect is directed to an electronic device that may include a device housing, at least one device orientation sensor carried by the housing, a plurality of haptic actuators spaced apart within the device housing, and a controller coupled to the device orientation sensor and the plurality of haptic actuators. The controller may be configured to cooperate with the at least one device orientation sensor to determine a sensed orientation of the device, and drive the plurality of haptic actuators to focus a haptic sensation based upon the sensed orientation of the device.

In another embodiment, an electronic device may include a device housing, at least one device proximity sensor carried by the device housing, and a plurality of haptic actuators spaced apart within the device housing. The electronic device may also include a controller coupled to the at least one device proximity sensor and the plurality of haptic actuators, the controller configured to cooperate with the at least one device proximity sensor to determine a sensed proximity of the electronic device to a given object, and drive the plurality of haptic actuators to focus a haptic sensation based upon the sensed proximity of the electronic device to the given object.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and numbers in increments of 100 are used to indicate similar elements in alternative embodiments.

Figure 1:
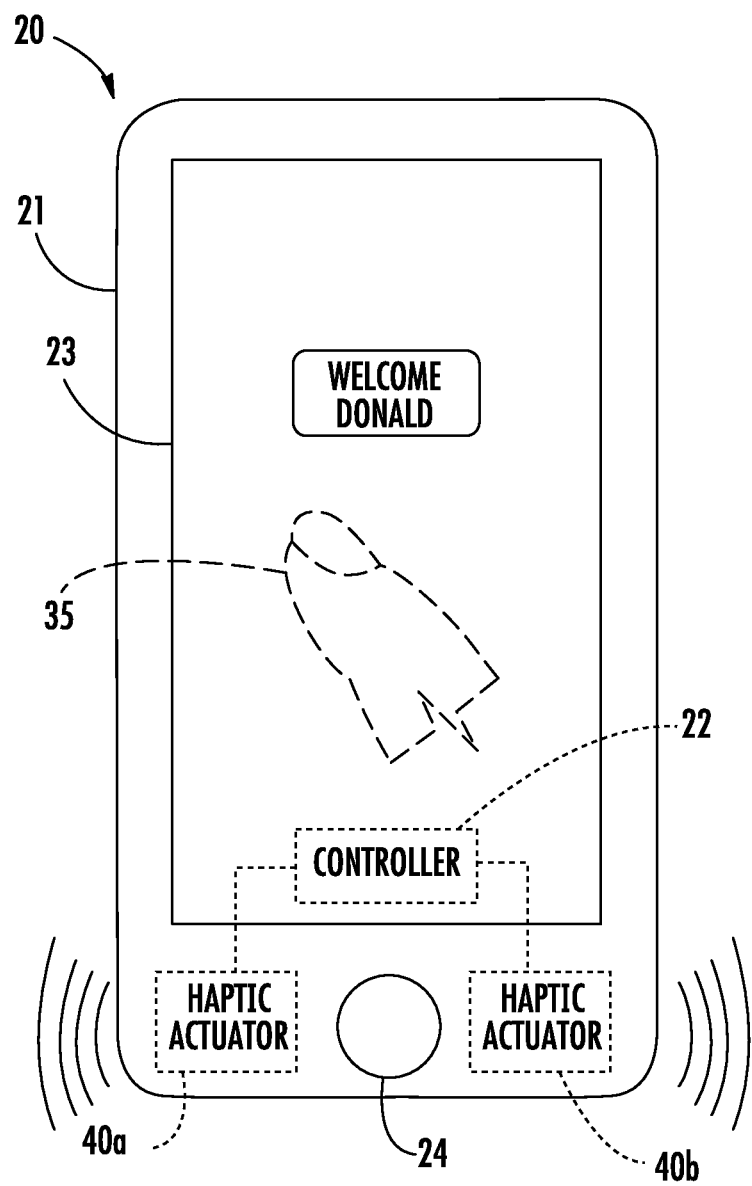
FIG. 1 is a perspective view of an electronic device including haptic actuators according to an embodiment.
Figure 2:
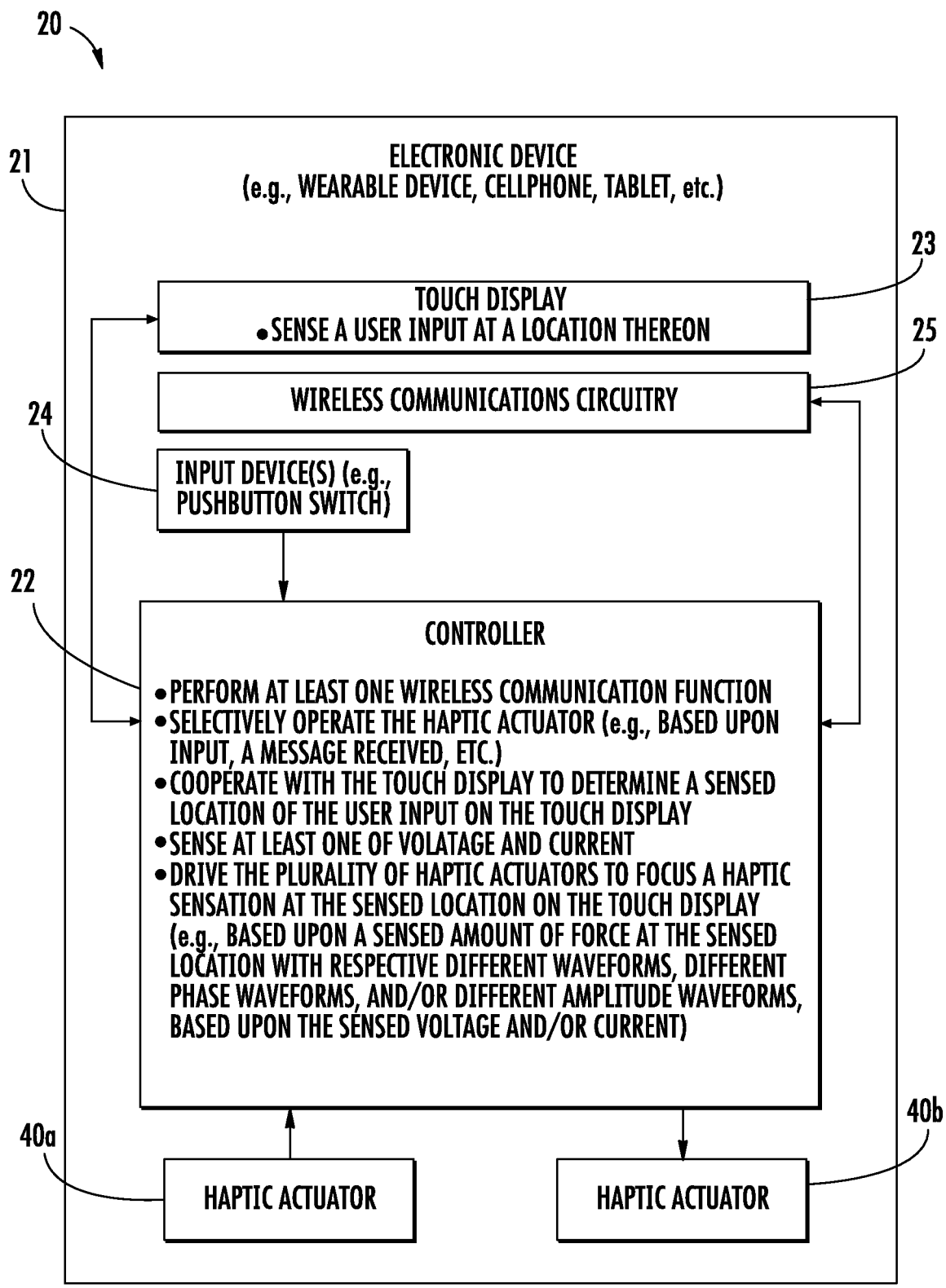
FIG. 2 is a schematic block diagram of the electronic device of FIG. 1.
Figure 3:
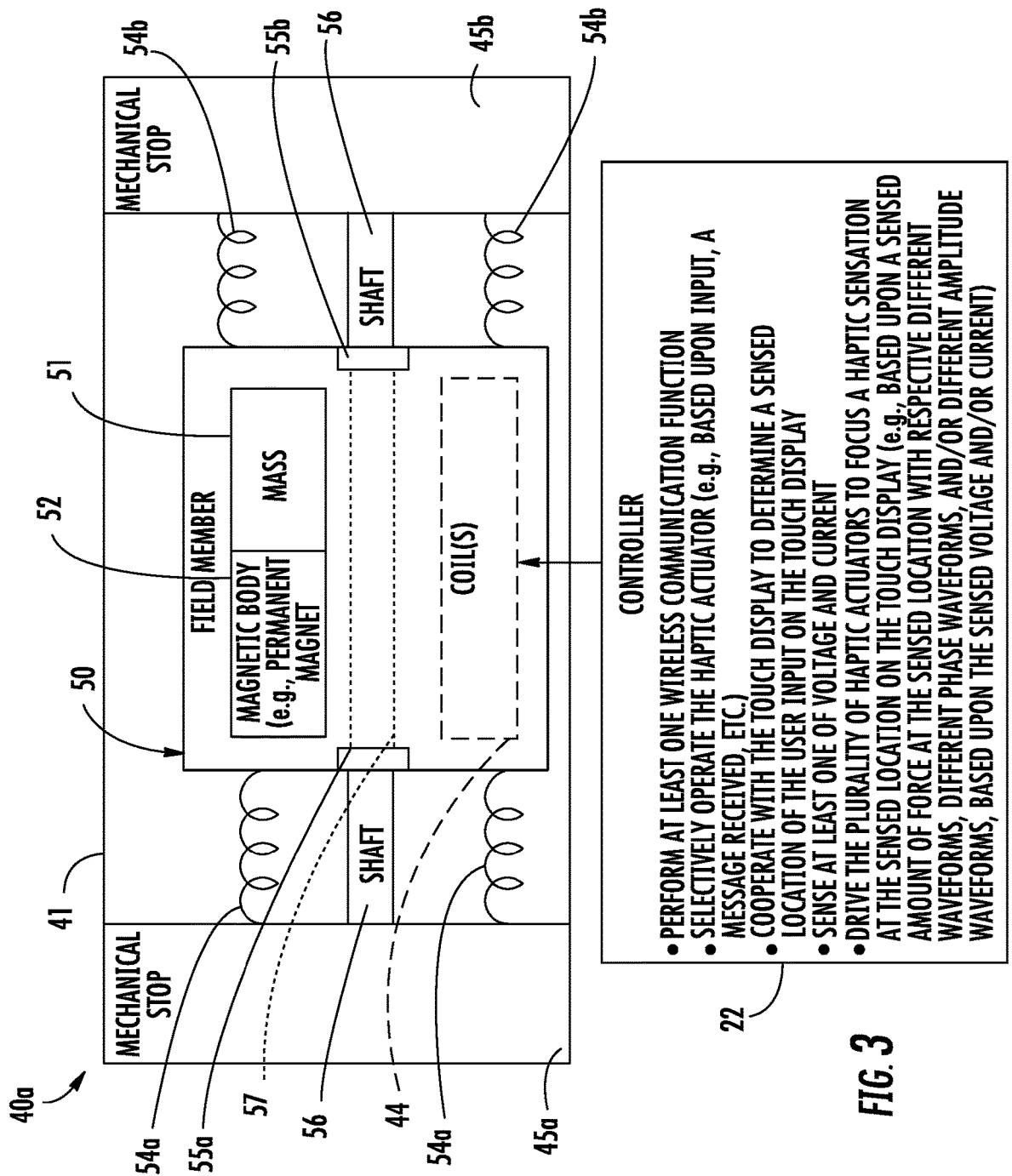
FIG. 3 is a more detailed schematic diagram of a haptic actuator of FIG. 1.

Referring initially to FIGS. 1-3, an electronic device 20 illustratively includes a device housing 21 and a controller 22 carried by the device housing. The electronic device 20 is illustratively a mobile wireless communications device, for example, a mobile telephone. The electronic device 20 may be another type of electronic device, for example, a wearable wireless communications device, and includes a band or strap for securing it to a user, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A touch display 23 is also carried by the device housing 21 and is coupled to the controller 22. The touch display 23 may be a light emitting diode (LED) touch display, for example, or may be another type of display, for example, a liquid crystal display (LCD) as will be appreciated by those skilled in the art. The touch display 23, as an input device, senses user input at a location thereon. More particularly, the touch display 23 senses contact with or an amount of force that corresponds to the user input at the sensed location.

A finger-operated user input device 24 illustratively in the form of a pushbutton switch is also carried by the device housing 21 and is coupled to the controller 22. The pushbutton switch 24 cooperates with the controller 22 to perform a device function in response to operation thereof. For example, a device function may include a powering on or off of the electronic device 20, initiating communication via the wireless communications circuitry 25, and/or performing a menu function. In some embodiments, the electronic device 20 may not include a pushbutton switch 24, as the finger-operated input device may be in another form, as will be appreciated by those skilled in the art.

The electronic device 20 illustratively includes haptic actuators 40a, 40b. The haptic actuators 40a, 40b are each coupled to the controller 22, which determines user indications and operates the haptic actuators by way of applying power, current, or a voltage to a coil 44 to move a field member 50 based upon the user indication. More particularly, the haptic actuators 40a, 40b each cooperate with the controller 22 to provide haptic feedback to the user. The haptic feedback may be in the form of relatively long and short vibrations or "taps", particularly, for example, when the electronic device 20 is in the form of a wearable device and the user is wearing the electronic device. The vibrations may be indicative of a message received, and the duration of the vibration may be indicative of the type of message received. Of course, the vibrations may be indicative of or convey other types of information. Further details of how haptic feedback is provided to the user from the haptic actuators 40a, 40b will be described in further detail below.

Additionally, while a controller 22 is described, it should be understood that the controller 22 may include one or more of a processor and other circuitry to perform the functions described herein, and some or all of the circuitry may be carried by an actuator housing and/or by the device housing 21.

With particular respect to FIG. 3, further details of an exemplary haptic actuator 40a are now described. The haptic actuator 40a includes an actuator housing 41. The coil 44 is carried by the actuator housing 41. Of course, there may be more than one coil carried by the housing 41.

The field member 50 is movable within the housing 41 responsive to the coil 44. The movement of the field member 50 creates the haptic feedback, or tapping, as will be appreciated by those skilled in the art. While the movement of the field member 50 may be described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 50 may include one or more masses 51 and may be shaped for a particular application or operation. The field member 50 may also include one or more permanent magnets 52, i.e. magnetic bodies, cooperating with the coil 44 to provide movement of the field member 50. The field member 50 has a shaft receiving passageway 57 therein. In some embodiments, the field member 50 may include the coil 44, and the permanent magnets may be carried by the actuator housing 41.

The haptic actuator 40a also includes biasing members 54a, 54b between the actuator housing 41 and the field member 50. The biasing members 54a, 54b are illustratively in the form of springs for maintaining the field member suspended in the housing 41. The springs 54a, 54b may be mechanical springs, such as, for example, coil springs, leaf springs, and flexures. The springs 54a, 54b may also or additionally be magnetic springs that, through interaction with the permanent magnets and/or ferritic parts of the actuator housing 41, if any, store and amplify the energy in the form of elastic/magnetic energy.

Additionally, the haptic actuator 40a includes a pair of bearings within the shaft receiving passageway 57. A shaft 56 extends through the bearings 55a, 55b and is coupled to the actuator housing 41 to permit reciprocal movement of the field member 50 along the shaft and within the housing responsive to the coil 44. Other and/or additional components, such as shafts, linear/angular bearings, sliding bearings, flexures, multi-bar linkage mechanisms, and springs, may enable motion of the field member 50 in the desired direction (e.g. X axis in a linear actuator or around a certain axis in an angular actuator) while constraining motion in other degrees of freedom.

The haptic actuator 40a also includes mechanical limit stops 45a, 45b between the housing 41 and the field member 50. The mechanical limit stops 45a, 45b limit the movement of the field member to a desired range and/or stop the field member from crashing or banging into the housing 41. While mechanical stops 45a, 45b are described, it will be appreciated that the mechanical stops may be part of or a portion of the housing 41.

Typically, circuitry, for example, the controller 22, generates a sinusoidal drive waveform that drives the field member 50 to move from an initial at-rest position, and thus generate haptic feedback. It should be appreciated by those skilled in the art that while a particular configuration of a haptic actuator 40a including certain components is illustrated, other haptic actuator configurations may be used, which may include other and/or additional components in different configurations. Moreover, each haptic actuator 40a, 40b may be configured differently, for example, have different springs for flexures.

The controller 22 cooperates with the touch display 23 to determine a sensed location of the user input on the touch display, for example, the user's finger 35, and more particularly, an amount of force at the sensed location. Based upon the amount of sensed force on the touch display 23, the controller 22 drives the haptic actuators 40a, 40b to focus a haptic sensation at the sensed location.

Figure 4A:
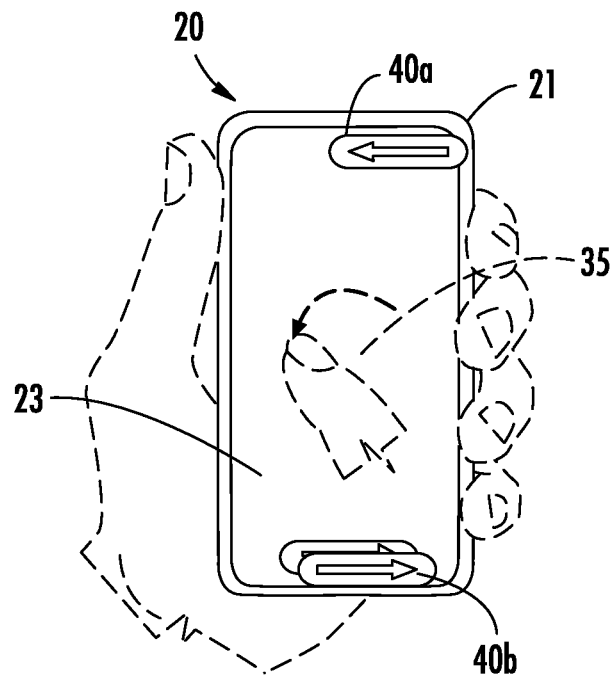
FIGS. 4a-4d are schematic diagrams illustrating different driving configurations of the haptic actuators of FIG. 2.

Referring now to FIGS. 4a-4d, to focus the haptic sensation and to drive the haptic actuators 40a, 40b to achieve a desired type of haptic actuation, for example, a sensation of rotation about the sensed location (FIG. 4a), the controller 22 may generate and drive each haptic actuator with a respective different waveform from among a plurality of different waveforms. More particularly, to achieve a rotation sensation, a second haptic actuator 40b of a pair thereof adjacent a periphery of the device housing 21 may be driven with a waveform having an amplitude in a given direction that is greater than an amplitude of the waveform driving the first haptic actuator 40a in a direction opposite that of the second haptic actuator (i.e. driven with different phase waveforms) (FIG. 4a).

Figure 4B:
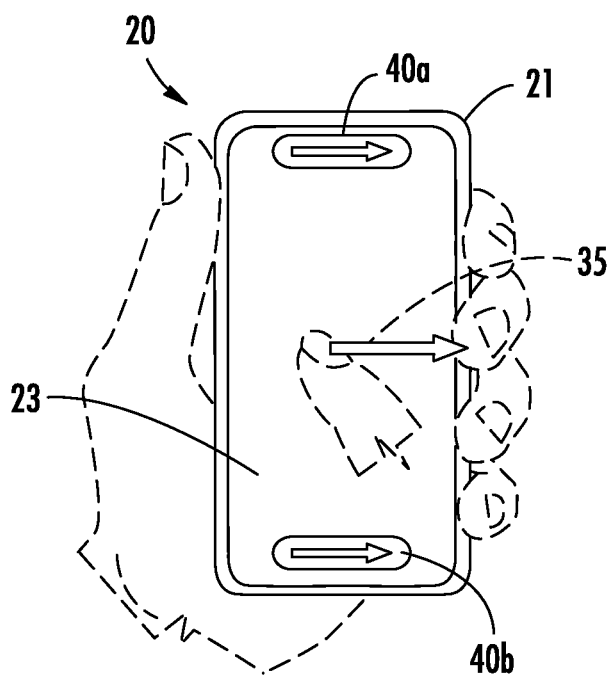
Figure 4C:
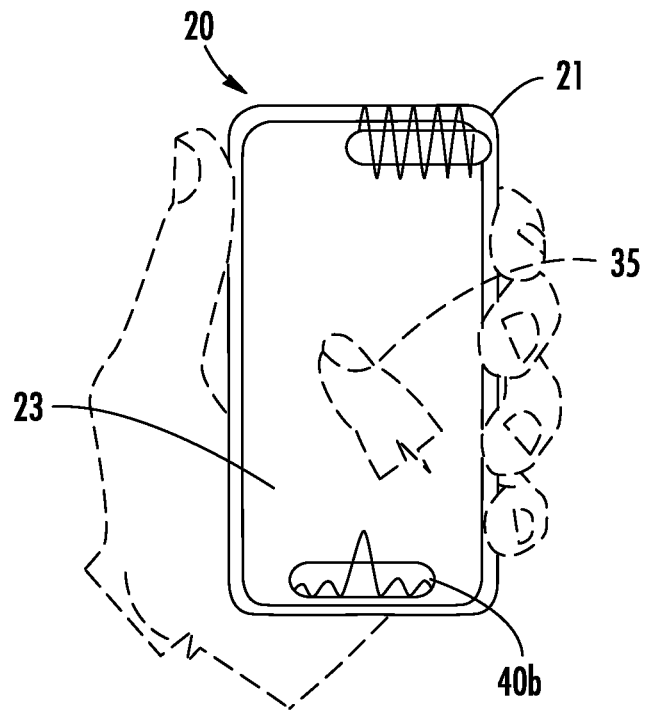

To achieve a haptic sensation across an entire length of the device housing 21, both first and second haptic actuators 40a, 40b may be operated in a synchronized manner in a given direction (i.e., driven with the same waveform) (FIG. 4b). In other embodiments, the controller 22 may drive one haptic actuator 40a with a "vibe" waveform while the other haptic actuator is driven with a "tap" waveform (i.e., driven with different waveforms) (FIG. 4c).

Figure 4D:
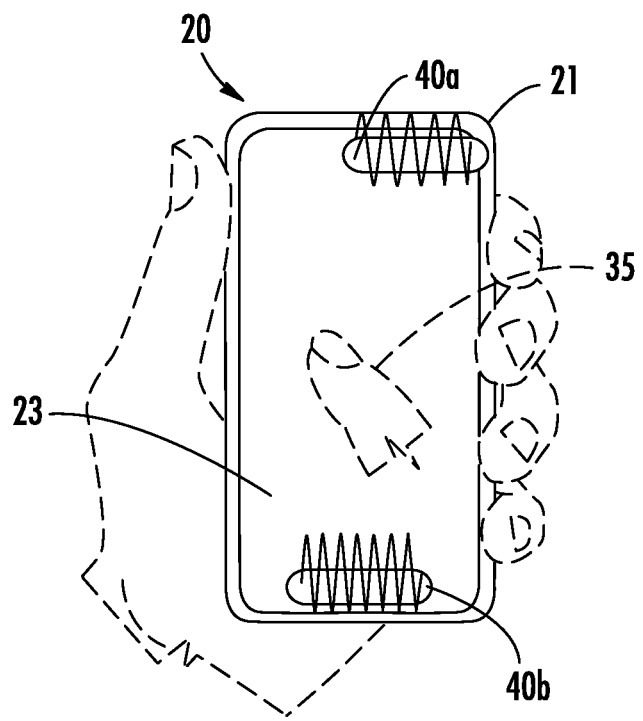

Still further, as noted above, each haptic actuator 40a, 40b may be a different type of haptic actuator, for example, different size, shape, bandwidth, and/or internal components. Accordingly, different types of haptic actuators generate different types of haptic feedback (FIG. 4d).

Figure 5:
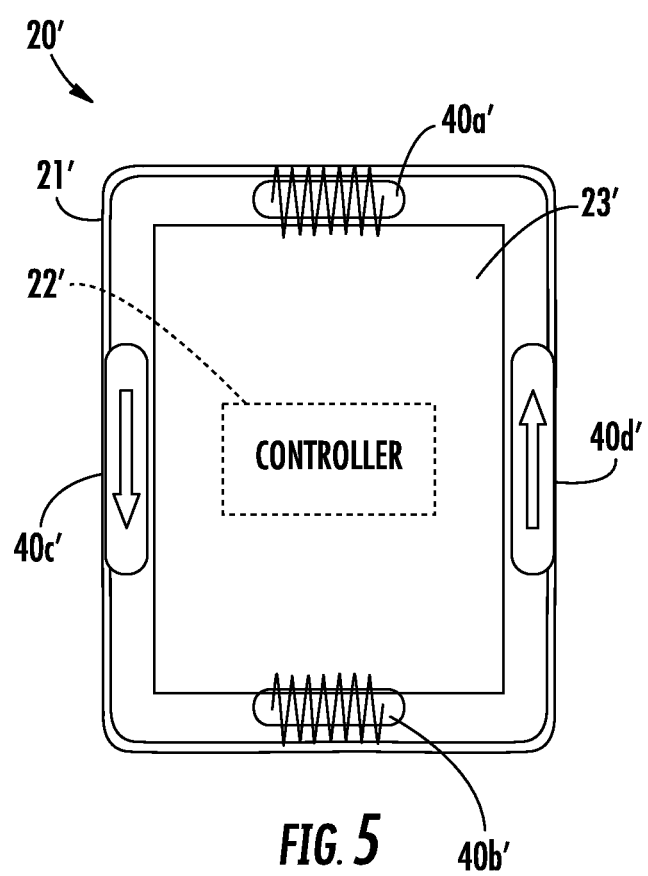
FIG. 5 is a schematic diagram of an electronic device illustrating a driving configuration of haptic actuators in accordance with another embodiment.

Referring now briefly to FIG. 5, two pairs of opposing haptic actuators 40a', 40b' and 40c', 40d' are positioned along a periphery of the housing 21' of the electronic device 20'. Each pair may be driven by the controller 22' at different waveforms, whether "tab" or "vibe", different amplitudes, and/or different phases, achieve a desired haptic sensation at the sensed location.

While the controller 22 generates or drives the haptic actuator with different waveforms, for example, having a different amplitude, phase, or waveform type, it should be understood that the controller may generate waveforms having any or all of different types, amplitudes, and/or phases for driving each haptic actuator 40a, 40b. Furthermore, to focus the haptic sensation, for example, at the sensed location, the controller 22 may determine where the given location is relative to the overall touch display 23 (e.g. location in a grid or array). The controller may adjust the waveforms accordingly. For example, the haptic actuators 40a, 40b may each be driven with a respective waveform having parameters to increase the haptic sensation at the sensed location. This may be determined based upon the construction, type, age, and/or other physical characteristic of the haptic actuators 40a, 40b, which may be known from manufacturing.

The controller 22 may also generate a respective waveform based upon the amounts of force detected. For example, if the amount of force at the sensed location is greater than a threshold force, the controller may generate a waveform that corresponds to driving the haptic actuators with a more pronounced haptic sensation and/or a different type of waveform. Of course, different waveforms may be generated to drive the haptic actuators 40a, 40b based upon the force at the sensed location, as may be desired.

To further achieve a more focused haptic sensation, it may be particularly desirable to sense any or both of the voltage and current (e.g., back EMF) of the haptic actuators 40a, 40b and drive the haptic actuators based thereon. The sensed current and/or voltage may provide the relative motion information that may be used by the controller 22 for driving the haptic actuators 40a, 40b. Additional sensing, for example, via one or more magnetic sensors to sense movement of the field member 50 may be used to determine the relative location or motion information. Further details of generating respective waveforms based upon the sensed voltage and/or current information and/or based upon magnetic sensor are explained in U.S. patent application Ser. No. 15/096,379 and U.S. Application Ser. No. 62/347,760 the entire contents of each of which are hereby incorporated in their entirety by reference.

A method aspect is directed to a method of driving a plurality of haptic actuators 40a, 40b spaced apart within a device housing 21 of an electronic device 20 that includes a touch display 23 carried by the device housing and configured to sense a user input at a location thereon. The method includes using a controller 22 coupled to the touch display 23 and the plurality of haptic actuators 40a, 40b to cooperate with the touch display to determine a sensed location of the user input on the touch display, and drive the plurality of haptic actuators to focus a haptic sensation at the sensed location on the touch display.

Figure 6:
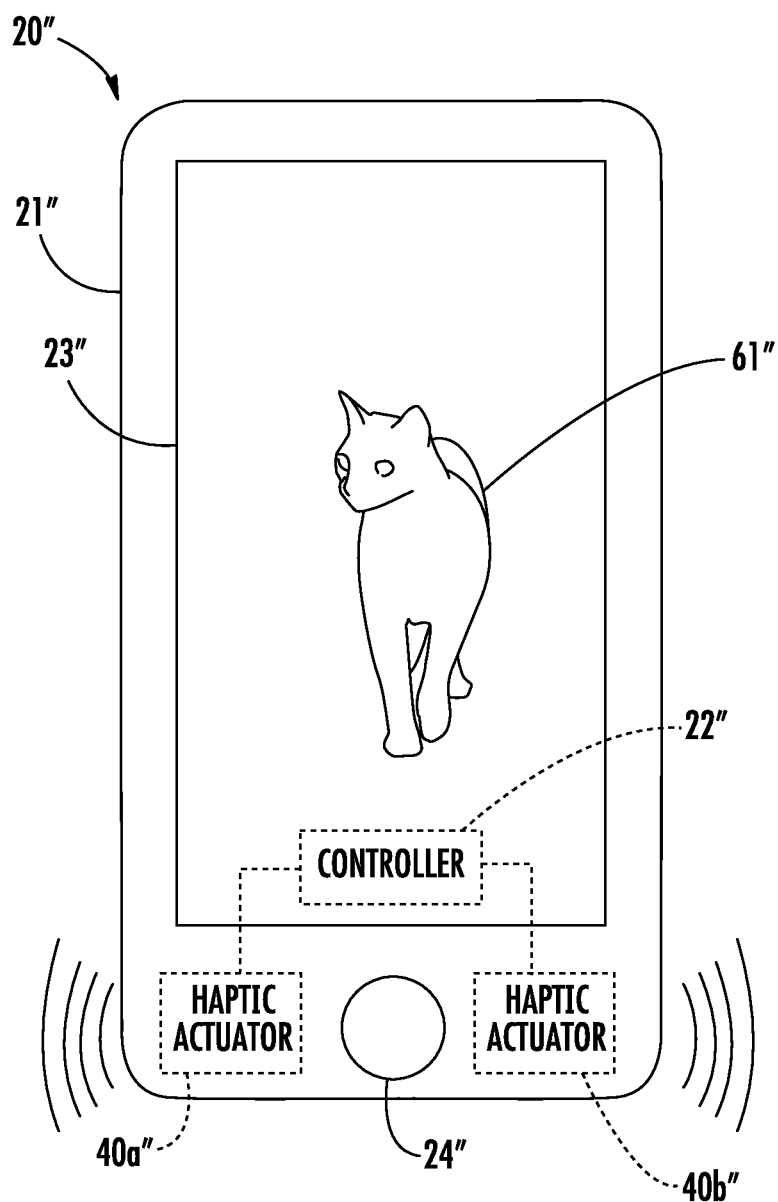
FIG. 6 is a perspective view of an electronic device including haptic actuators according to another embodiment.
Figure 7:
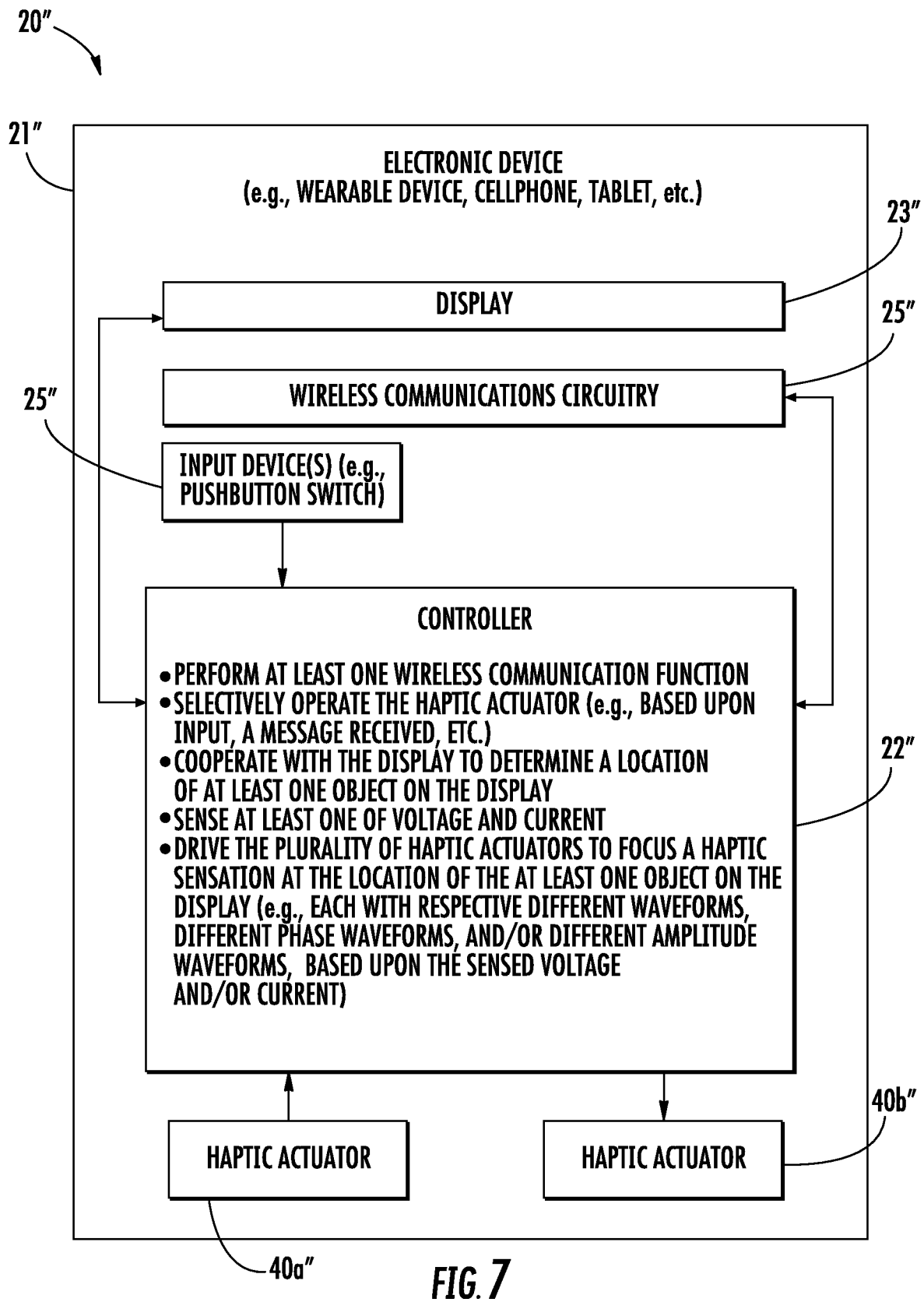
FIG. 7 is a schematic block diagram of the electronic device of FIG. 6.

Referring now to FIGS. 6 and 7, in another embodiment, the haptic sensation may be focused based upon objects displayed on the display 23". For example, a user may be playing a game that displays an object 61", for example, a symbol or character on the display 23". The controller 22" cooperates with the display 23" to determine a location of the object displayed on the display. The controller 22" drives the haptic actuators 40a", 40b" to focus a haptic sensation at the location of the object 61" or character on the display 23"'. While a character is an example of an object, it should be understood that the object may be a displayed location of an event on the display 23". For example, if, in a block game, a block is destroyed, the controller 22" may focus the haptic sensation at the location of the block being destroyed. Moreover, while two haptic actuators 40a", 40b" are illustrated, it will be appreciated that there may be more than two haptic actuators, which may be spaced within the device housing 21" in a different configuration than illustrated. Elements illustrated but not specifically described herein are similar to those described in the embodiments described above and need no further discussion herein.

A method aspect is directed to a method of driving a plurality of haptic actuators 40a", 40b" spaced apart within a device housing 21" of an electronic device 20" that includes a display 23" carried by the device housing, and a controller 22" coupled to the display and the plurality of haptic actuators. The method includes using the controller 22" to cooperate with the display 23" to determine a location of at least one object displayed on the display, and drive the plurality of haptic actuators 40a", 40b" to focus a haptic sensation at the location of the at least one object on the display.

Figure 8:
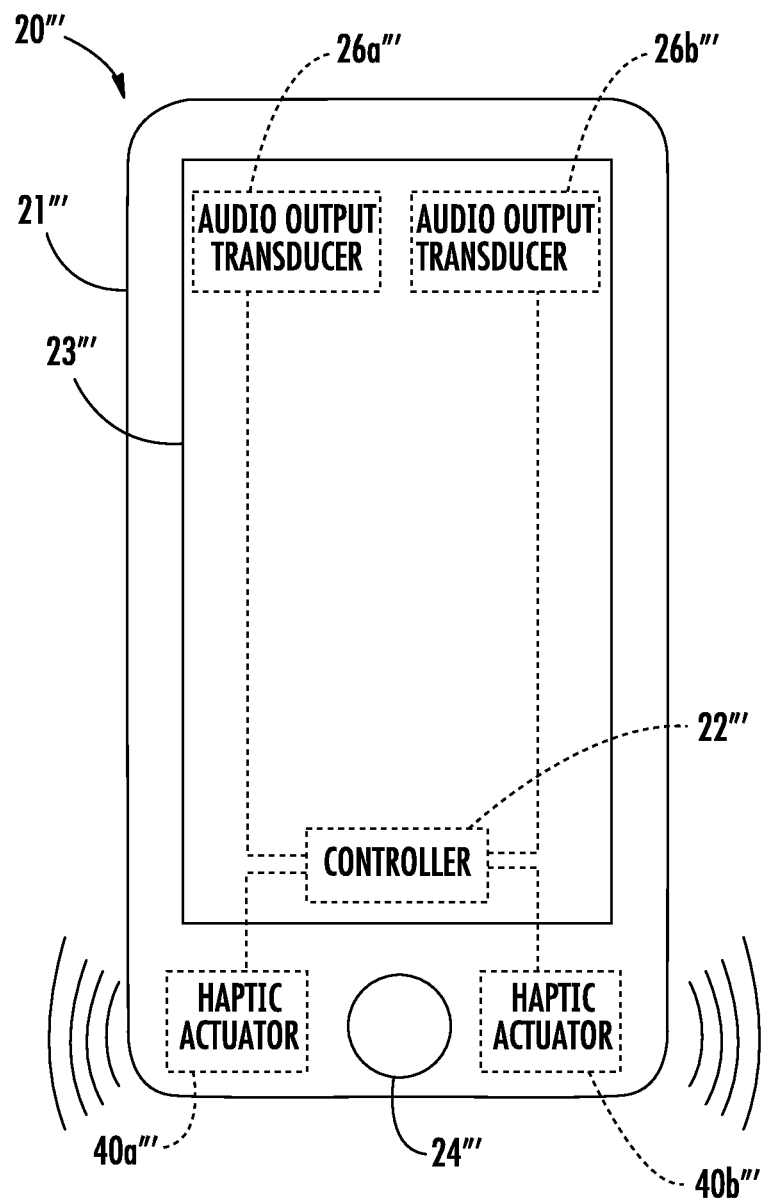
FIG. 8 is a perspective view of an electronic device including haptic actuators according to another embodiment.
Figure 9:
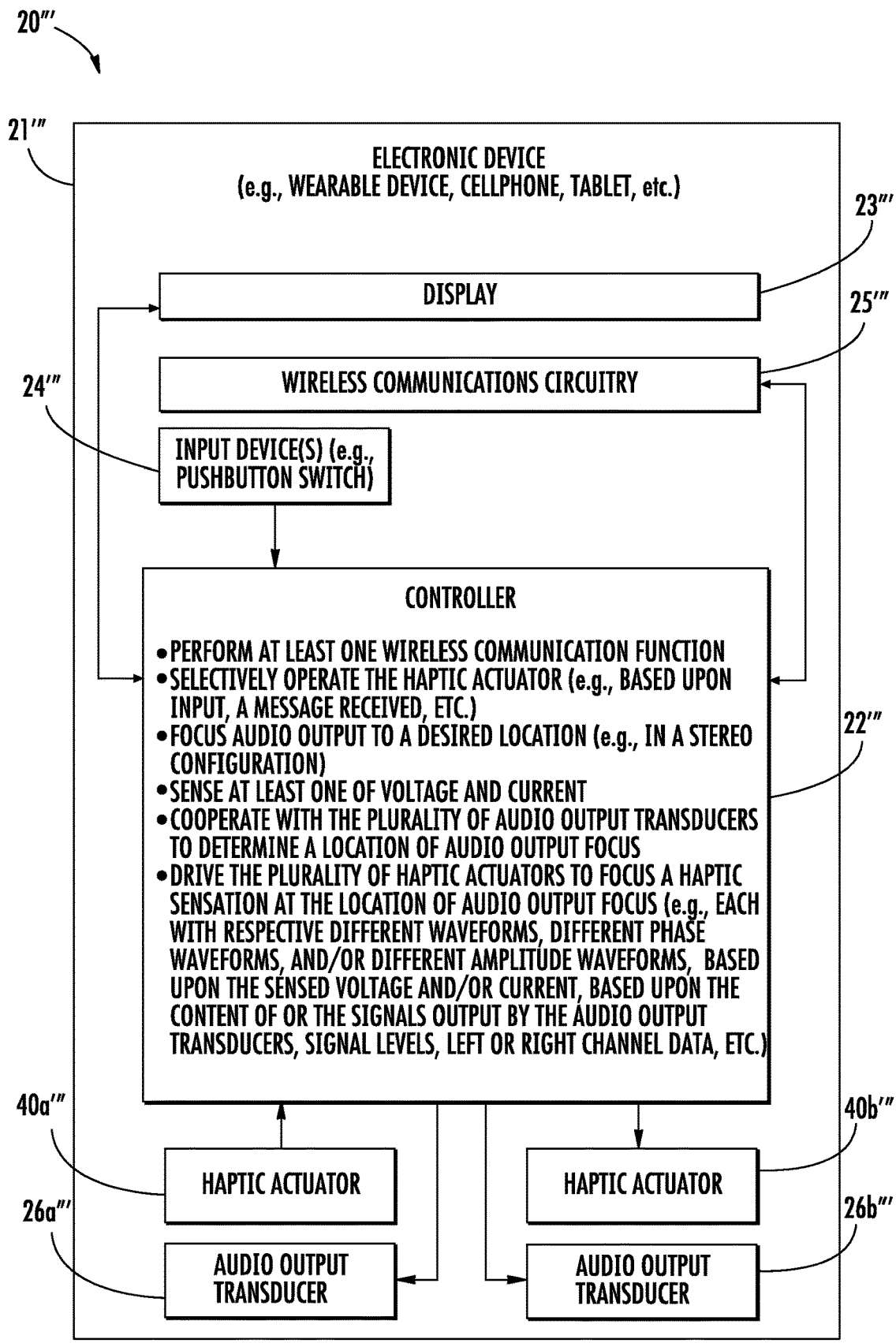
FIG. 9 is a schematic block diagram of the electronic device of FIG. 8.

Referring now to FIGS. 8 and 9 in another embodiment, the electronic device 20'" includes audio output transducers 26a'", 26b'" carried by the device housing 21'". The controller 22'" may drive the audio output transducers 26a'", 26b'" in a stereo configuration (e.g., left and right channels). The controller 22'" operating in a stereo configuration, for example, may focus audio output to a desired location. The controller 22'" cooperates with the audio output transducers 26a'", 26b'", for example, to determine the location of audio output focus, and drives the haptic actuators to focus a haptic sensation at the location of audio output focus. For example, if audio is directed to a particular location in a game, the haptic sensation may also be directed to that location. Moreover, while two haptic actuators 40a'", 40b'" are illustrated, it will be appreciated that there may be more than two haptic actuators, which may be spaced within the device housing 21'" in a different configuration than illustrated.

The controller 22'" may alternatively or additionally drive the haptic actuators 40a'", 40b'" based upon the content of or the signals output by the audio output transducers 26a'", 26b'". The content may include signal levels, left or right channel data, etc., as will be appreciated by those skilled in the art. Elements illustrated but not specifically described herein are similar to those described in the embodiments described above and need no further discussion herein.

A method aspect is directed to driving haptic actuators 40a'", 40b'" spaced apart within a device housing 21'" of an electronic device 20'" that includes an audio output transducers 26a'", 26b'" carried by the device housing and a controller 22'" coupled to the audio output transducers and the haptic actuators. The method includes using the controller 22'" to cooperate with the audio output transducers 26a'", 26b'" to determine a location of audio output focus, and drive the haptic actuators 40a'", 40b'" to focus a haptic sensation at the location of audio output focus.

Figure 10:
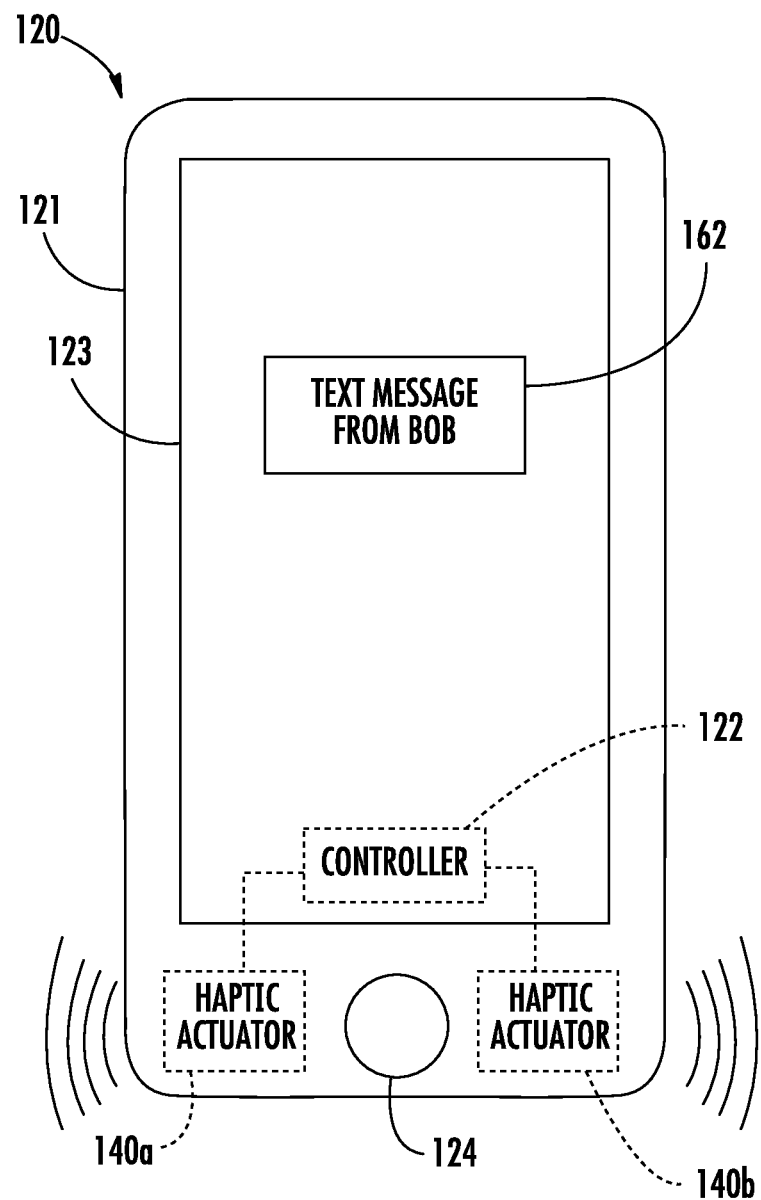
FIG. 10 is a perspective view of an electronic device including haptic actuators according to another embodiment.
Figure 11:
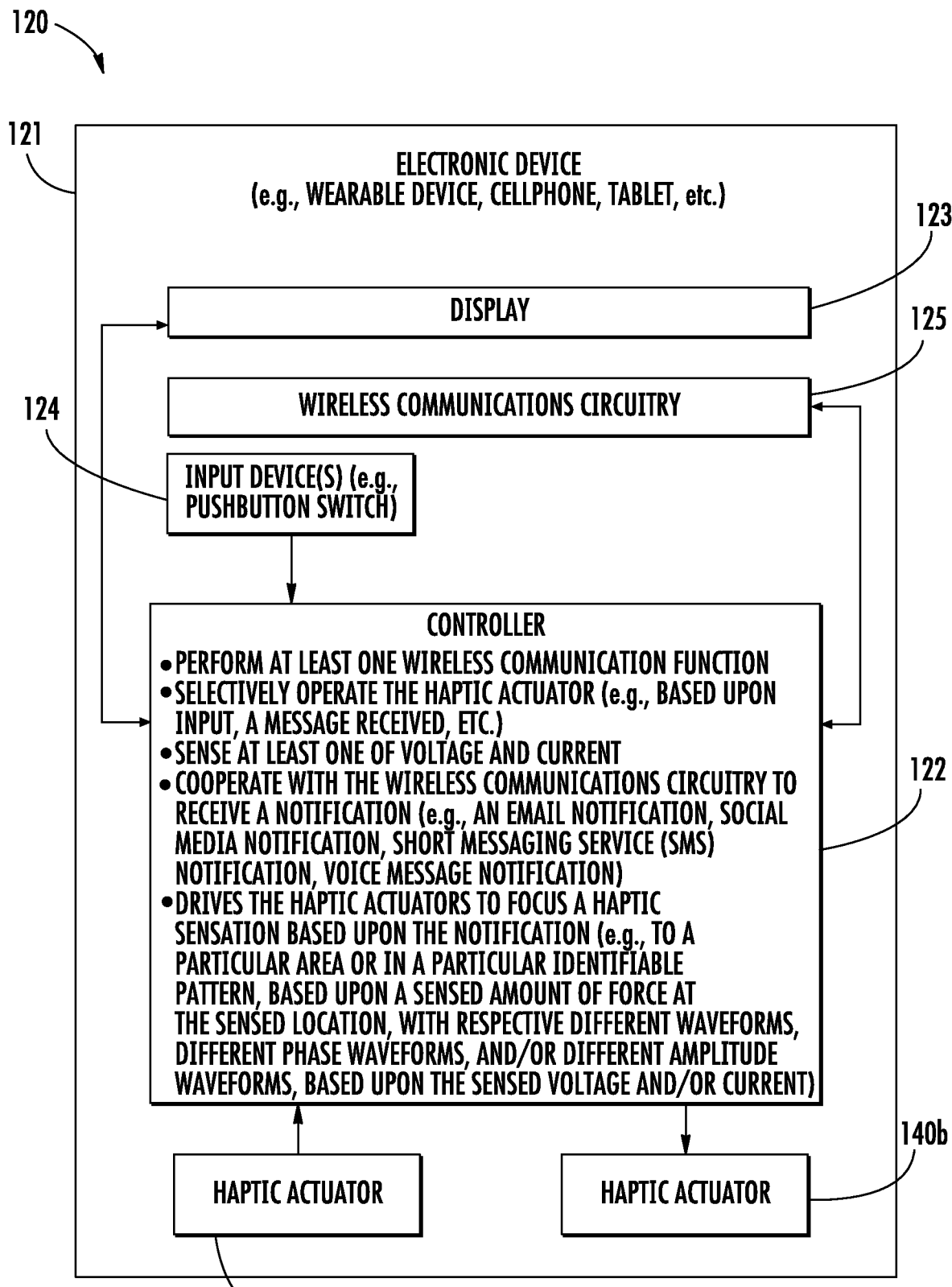
FIG. 11 is a schematic block diagram of the electronic device of FIG. 10.

Referring now to FIGS. 10 and 11, in another embodiment, the controller 122 of the electronic device 120 cooperates with the wireless communications circuitry 125 to receive a notification 162. The wireless communications circuitry 125 is similar to the wireless communications circuitry described above. The notification 162 may include one of an email notification, social media notification, short messaging service (SMS) notification, and voice message notification.

The controller 122 drives the haptic actuators 140a, 140b to focus a haptic sensation based upon the notification 162. For example, if the notification is an SMS notification, the controller 122 may focus the haptic sensation to a particular area or in a particular pattern that may be identifiable as an SMS notification. If the notification 162 is an email notification, for example, the controller 122 may focus the haptic sensation to another particular area or in another particular pattern so that it is identifiable as an email notification. The notification 162 may be another type of notification, for example, and/or haptic sensations may be grouped by type of notification. Elements illustrated but not specifically described herein are similar to those described in the embodiments described above and need no further discussion herein.

A method aspect is directed to a method of driving haptic actuators 140a, 140b within a device housing 121 of an electronic device 120 that includes wireless communications circuitry 125 carried by the device housing and a controller 122 coupled to the wireless communications circuitry and the haptic actuators. The method includes using the controller 122 to cooperate with the wireless communications circuitry 125 to receive a notification 162, and drive the haptic actuators 140a, 140b to focus a haptic sensation based upon the notification.

Figure 12:
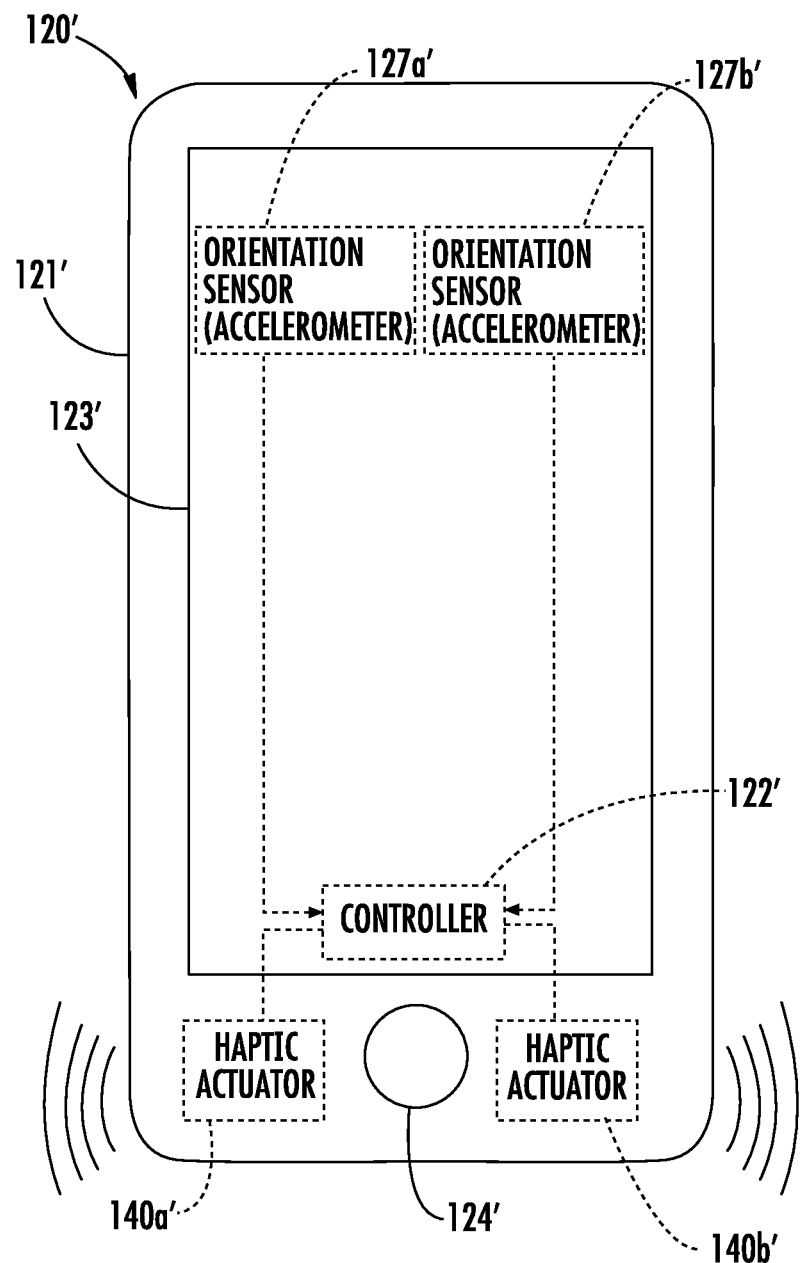
FIG. 12 is a perspective view of an electronic device including haptic actuators according to another embodiment.
Figure 13:
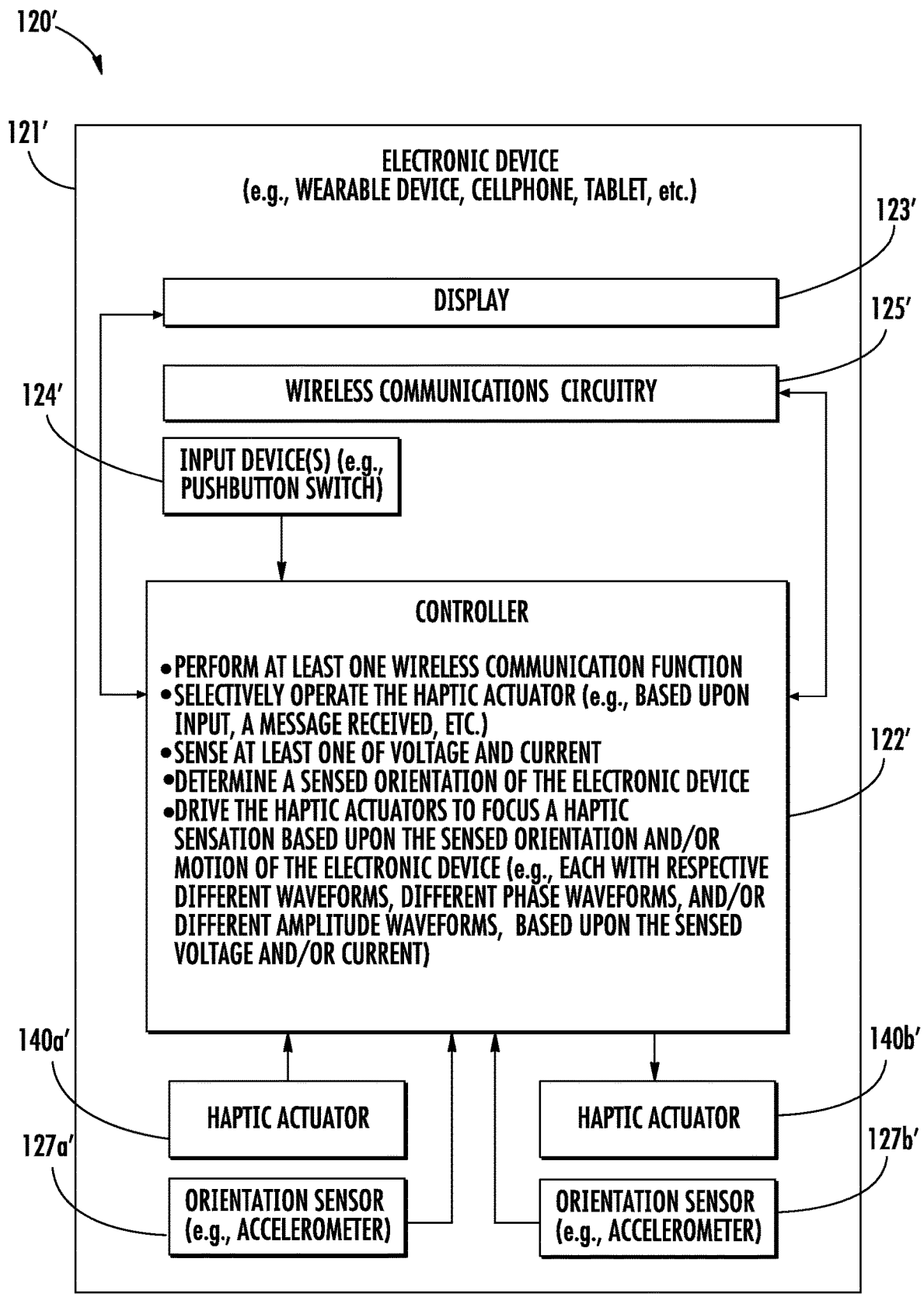
FIG. 13 is a schematic block diagram of the electronic device of FIG. 12.

Referring now to FIGS. 12 and 13, in another embodiment, the haptic sensation is focused based upon a sensed orientation of the electronic device 120'. Illustratively, the electronic device 120' includes device orientation sensors 127a', 127b' carried by the device housing 121'. The device orientation sensors 127a', 127b' may each include an accelerometer, for example. In some embodiments, there may be a single device orientation sensor or more than two device orientation sensors. The controller 122' cooperates with the device orientation sensors 127a', 127b' to determine a sensed orientation of the electronic device 120'. The controller 120' drives the haptic actuators 140a', 140b' to focus a haptic sensation based upon the sensed orientation of the electronic device 120'. For example, if the electronic device 120' is on a table, the controller 122' may provide an associated haptic sensation. The haptic sensation may be focused, for example, to reduce vibration noise. If the electronic device 120' is carried in a pocket of a user, for example, the controller 122' may focus the haptic sensation so that the haptic sensation or feedback is more easily felt by the user. In some embodiments, the orientation sensors, for example, when in the form of accelerometers, may focus the haptic sensation based upon motion. Elements illustrated but not specifically described herein are similar to those described in the embodiments described above and need no further discussion herein.

A method aspect is directed to a method of driving haptic actuators 140a', 140b' spaced apart within a device housing 121' of an electronic device 120' that includes at least one device orientation sensor 127a', 127b' carried by the device housing and a controller 122' coupled to the device orientation sensor and the haptic actuators. The method includes using the controller 122' to cooperate with the at least one device orientation sensor 127a', 127b' to determine a sensed orientation of the electronic device 120', and drive the haptic actuators 140e, 140b' to focus a haptic sensation based upon the sensed orientation of the electronic device.

Figure 14:
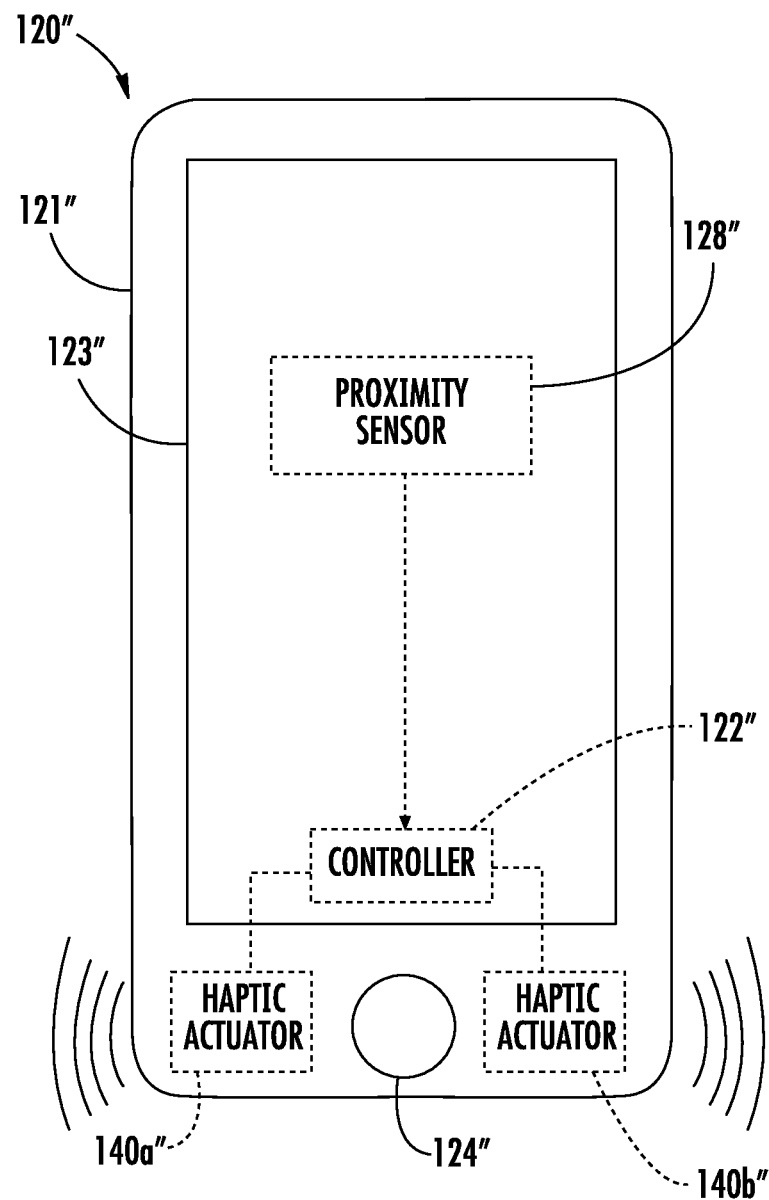
FIG. 14 is a perspective view of an electronic device including haptic actuators according to another embodiment.
Figure 15:
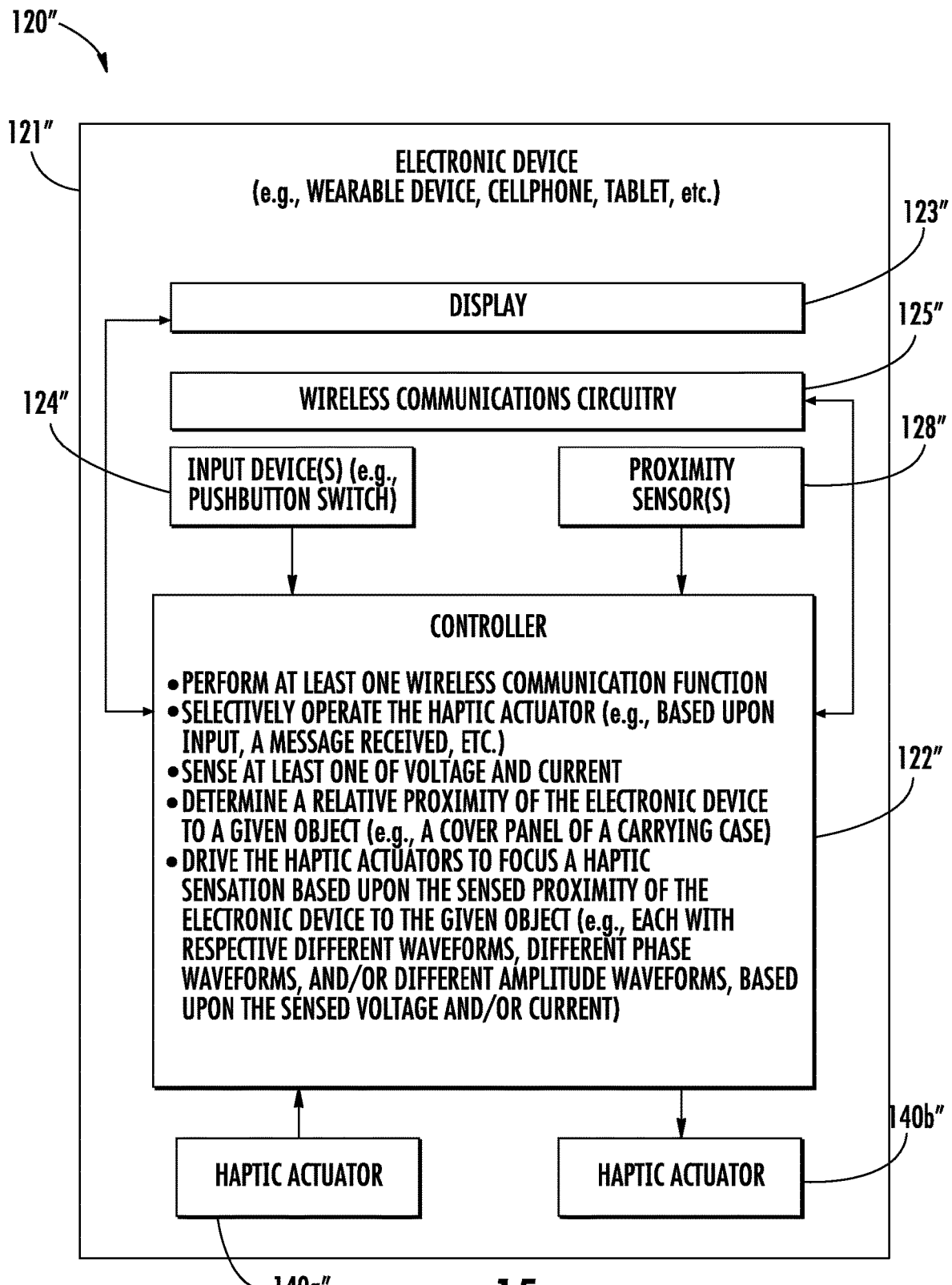
FIG. 15 is a schematic block diagram of the electronic device of FIG. 14.

Referring now to FIGS. 14 and 15, in yet another other embodiment, the electronic device 120" may include a proximity sensor 128" carried by the device housing 121". The controller 122" may cooperate with the proximity sensor 128" to determine a relative proximity of the electronic device 120" to a given object, for example, a cover panel of a carrying case. The controller 122" drives the haptic actuators 140a", 140b" to focus a haptic sensation based upon the sensed proximity of the electronic device 120" to the given object. Of course, there may be more than one proximity sensor 128". For example, where the given object is a cover panel, the controller 122" may focus the haptic sensation to account for the cover panel. Elements illustrated but not specifically described herein are similar to those described in the embodiments described above and need no further discussion herein.

A method aspect is directed to a method of driving haptic actuators 140a", 140b" spaced apart within a device housing 121" of an electronic device 120" that includes at least one proximity sensor 128" carried by the device housing and a controller 122" coupled to the proximity sensor and the actuators. The method includes using the controller 122" to cooperate with the at least one proximity sensor 128" to sense a proximity of a given object to the electronic device 120", and drive the haptic actuators 140a", 140b" to focus a haptic sensation based upon the sensed proximity of the given object to the electronic device.

While several different embodiments have been described individually, it should be noted that any of the embodiments described herein can be used with other embodiments. In other words, elements described herein in the different embodiments are interchangeable among the different embodiments. Moreover, while a controller has been described herein, it should be noted that the controller may include circuitry that performs electronic device operations or functions. For example, the controller may include circuitry of a device central processing unit (CPU) and/or circuitry for controlling the haptic actuators. Of course, the controller may include other and/or additional circuitry.

Figure 16:
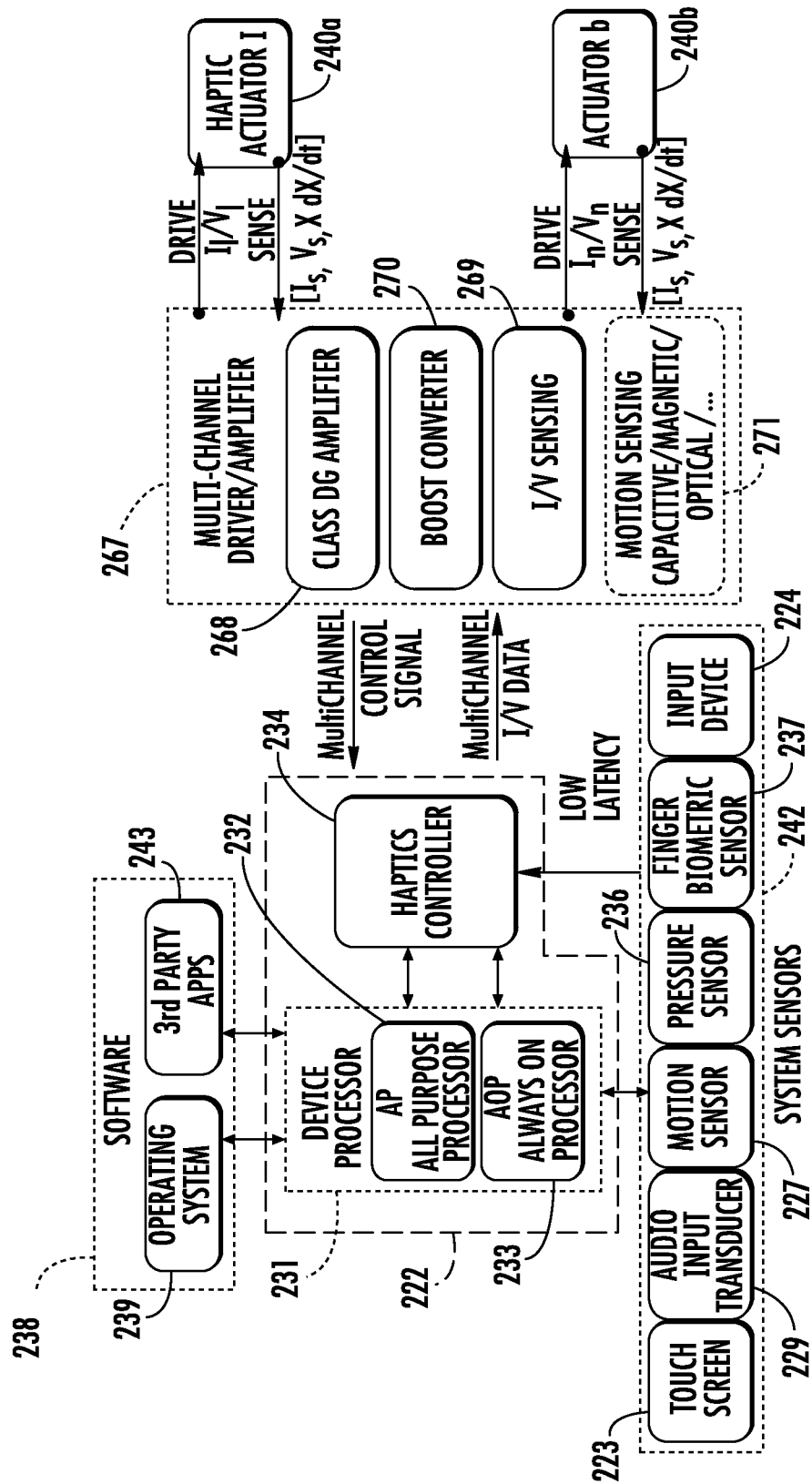
FIG. 16 is a schematic block diagram of an exemplary multi-haptic actuator architecture according to an embodiment.

Referring now to FIG. 16, an exemplary architecture including multiple haptic actuators 240a, 240b will now be described. In the example architecture, the controller 222 may include both a device processor 231 or CPU, which may include an all-purpose processor 232 and an always-on processor 233, as will be appreciated by those skilled in the art. The controller 222 may also include a haptics controller 234 coupled to the device processor. The device processor 231 or CPU may cooperate with or gather sensor data from any one or more sensors 242, for example, a touch screen display 223, an audio input transducer 229, a motion sensor 227 or orientation sensor (e.g., an accelerometer), a pressure sensor 236, a finger biometric sensor 237, and an input device 224 (e.g. home button or pushbutton switch). Input may also be provided to the device processor 231 from software 238 or an application stored on the electronic device 220, for example, operating system software 239 and/or third party applications 243. Of course, input may be provided to the device processor 231 from other and/or additional sources/sensors. The device processor 231 may, based upon the gathered or sensed data from the software 238 and/or sensors 242, cooperate with or command the haptics controller 234 so that the haptics controller may generate respective waveforms (e.g., multi-channel current/voltage data), via a multi-channel driver/amplifier circuit 267. The haptics controller 234 may also receive multi-channel control signals from the multi-channel driver/amplifier circuit 267.

The driver/amplifier circuit 267 amplifiers the output of the haptics controller 234 to drive the haptic actuators 240a, 240b, for example, via a class DG amplifier 268. The driver/amplifier circuit 267 monitors and senses the electrical input (current and voltage) to the haptic actuators 240a, 240b via I/V sensing circuitry 269 that senses or estimates both velocity and position (e.g., by sensing the back EMF). The driver/amplifier circuit 267 also includes a boost converter 270. Motion of the haptic actuators 240a, 240b may also sensed by motion sensing circuitry 271. The motion sensing circuitry 271 may include capacitive, magnetic, and/or optical motion sensing circuitry. Of course, the motion sensing circuitry 271 may include other and/or additional types of sensing circuitry. In some embodiments, the haptic controller 234 may communicate directly with the sensors 242, for example, to provide lower latency. Moreover, while two haptic actuators 240a, 240b are illustrated, it should be noted that any number of haptic actuators may be included.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

An electronic device comprises a device housing, a display carried by the device housing, and a plurality of haptic actuators spaced apart within the device housing. The electronic device comprises a controller coupled to the display and the plurality of haptic actuators. The controller is configured to cooperate with the display to determine a location of at least one object displayed on the display, and drive the plurality of haptic actuators to focus a haptic sensation at the location of the at least one object on the display.

The controller is configured to drive each of the plurality of haptic actuators with a respective one of a plurality of different waveforms.

The plurality of haptic actuators comprises a pair of opposing haptic actuators.

The plurality of haptic actuators are carried along a periphery of the device housing.

The controller is configured to drive the plurality of haptic actuators with different phase waveforms.

The controller is configured to drive the plurality of haptic actuators with different amplitude waveforms.

The controller is configured to drive the plurality of haptic actuators with a same waveform.

The controller is configured to sense at least one of voltage and current and drive the plurality of haptic actuators based thereon.

Each of the plurality of haptic actuators comprises a haptic actuator housing, a field member movable within the haptic actuator housing, and a coil cooperating with the field member.

An electronic device comprises a device housing, a display carried by the device housing, and a plurality of haptic actuators spaced apart within and carried along a periphery of the device housing. The electronic device comprises a controller coupled to the display and the plurality of haptic actuators. The controller is configured to cooperate with the display to determine a location of at least one object displayed on the display, and drive each of the plurality of haptic actuators with respective different waveforms to focus a haptic sensation at the location of the at least one object on the display.

The plurality of haptic actuators comprises a pair of opposing haptic actuators.

The controller is configured to drive the plurality of haptic actuators with different phase waveforms.

The controller is configured to drive the plurality of haptic actuators with different amplitude waveforms.

A method of driving a plurality of haptic actuators spaced apart within a device housing of an electronic device comprising a display carried by the device housing, and a controller coupled to the display and the plurality of haptic actuators comprises using the controller to cooperate with the display to determine a location of at least one object displayed on the display, and drive the plurality of haptic actuators to focus a haptic sensation at the location of the at least one object on the display.

The controller is used to drive each of the plurality of haptic actuators with a respective one of a plurality of different waveforms.

The controller is used to drive the plurality of haptic actuators with different phase waveforms.

The controller is configured to drive the plurality of haptic actuators with different amplitude waveforms.

The controller is used to drive the plurality of haptic actuators with a same waveform.

An electronic device comprises a device housing, a plurality of audio output transducers carried by the device housing, and a plurality of haptic actuators spaced apart within the device housing. The electronic device comprises a controller coupled to the plurality of audio output transducers and the plurality of haptic actuators. The controller is configured to cooperate with the plurality of audio output transducers to determine a location of audio output focus, and drive the plurality of haptic actuators to focus a haptic sensation at the location of audio output focus.

The controller is configured to cooperate with the plurality of audio output transducers to focus audio output.

The controller is configured to drive the plurality of audio output transducers in a stereo configuration.

The controller is configured to drive each of the plurality of haptic actuators with a respective one of a plurality of different waveforms.

The plurality of haptic actuators comprises a pair of opposing haptic actuators.

The plurality of haptic actuators are carried along a periphery of the device housing.

The controller is configured to drive the plurality of haptic actuators with different phase waveforms.

The controller is configured to drive the plurality of haptic actuators with different amplitude waveforms.

The controller is configured to drive the plurality of haptic actuators with a same waveform.

The controller is configured to sense at least one of voltage and current and drive the plurality of haptic actuators based thereon.

Each of the plurality of haptic actuators comprises a haptic actuator housing, a field member movable within the haptic actuator housing, and a coil cooperating with the field member.

An electronic device comprises a device housing, a plurality of audio output transducers carried by the device housing, and a plurality of haptic actuators spaced apart within and carried along a periphery of the device housing. The electronic device comprises a controller coupled to the plurality of audio output transducers and the plurality of haptic actuators. The controller is configured to cooperate with the plurality of audio output transducers to focus audio output, cooperate with the plurality of audio output transducers to determine a location of the focused audio output, and drive the plurality of haptic actuators to focus a haptic sensation at the location of focused audio output.

The controller is configured to drive the plurality of audio output transducers in a stereo configuration.

The controller is configured to drive each of the plurality of haptic actuators with a respective one of a plurality of different waveforms.

The plurality of haptic actuators comprises a pair of opposing haptic actuators.

The controller is configured to drive the plurality of haptic actuators with different phase waveforms.

The controller is configured to drive the plurality of haptic actuators with different amplitude waveforms.

The controller is configured to drive the plurality of haptic actuators with a same waveform.

A method of driving a plurality of haptic actuators spaced apart within a device housing of an electronic device comprising a plurality of audio output transducers carried by the device housing and a controller coupled to the plurality of audio output transducers and the plurality of haptic actuators comprises using the controller to cooperate with the plurality of audio output transducers to determine a location of audio output focus, and drive the plurality of haptic actuators to focus a haptic sensation at the location of audio output focus.

The controller is used to cooperate with the plurality of audio output transducers to focus audio output.

The controller is used to drive the plurality of audio output transducers in a stereo configuration.

The controller is used to drive each of the plurality of haptic actuators with a respective one of a plurality of different waveforms.

The controller is used to drive the plurality of haptic actuators with different phase waveforms.

The controller is used to drive the plurality of haptic actuators with different amplitude waveforms.

The controller is used to drive the plurality of haptic actuators with a same waveform.

An electronic device comprises a device housing, wireless communications circuitry carried by the device housing, and a plurality of haptic actuators spaced apart within the device housing. The electronic device comprises a controller coupled to the wireless communications circuitry and the plurality of haptic actuators. The controller is configured to cooperate with the wireless communications circuitry to receive a notification, and drive the plurality of haptic actuators to focus a haptic sensation based upon the notification.

The notification comprises one of an email notification, social media notification, short messaging service (SMS) notification, and voice message notification.

The controller is configured to drive each of the plurality of haptic actuators with a respective one of a plurality of different waveforms.

The plurality of haptic actuators comprises a pair of opposing haptic actuators.

The plurality of haptic actuators are carried along a periphery of the device housing.

The controller is configured to drive the plurality of haptic actuators with different phase waveforms.

The controller is configured to drive the plurality of haptic actuators with different amplitude waveforms.

The controller is configured to drive the plurality of haptic actuators with a same waveform.

The controller is configured to sense at least one of voltage and current and drive the plurality of haptic actuators based thereon.

Each of the plurality of haptic actuators comprises a haptic actuator housing, a field member movable within the haptic actuator housing, and a coil cooperating with the field member.

An electronic device comprises a device housing, wireless communications circuitry carried by the device housing, and a plurality of haptic actuators spaced apart within and carried along a periphery of the device housing. The electronic device comprises a controller coupled to the wireless communications circuitry and the plurality of haptic actuators. The controller is configured to cooperate with the wireless communications circuitry to receive a notification comprising one of an email notification, social media notification, short messaging service (SMS) notification, and voice message notification, and drive the plurality of haptic actuators to focus a haptic sensation based upon the notification.

The controller is configured to drive each of the plurality of haptic actuators with a respective one of a plurality of different waveforms.

The controller is configured to drive the plurality of haptic actuators with different phase waveforms.

The controller is configured to drive the plurality of haptic actuators with different amplitude waveforms.

The controller is configured to drive the plurality of haptic actuators with a same waveform.

A method of driving a plurality of haptic actuators within a device housing of an electronic device comprising wireless communications circuitry carried by the device housing and a controller coupled to the wireless communications circuitry and the plurality of haptic actuators comprises using the controller to cooperate with the wireless communications circuitry to receive a notification, and drive the plurality of haptic actuators to focus a haptic sensation based upon the notification.

The notification comprises one of an email notification, social media notification, short messaging service (SMS) notification, and voice message notification.

The controller is used to drive each of the plurality of haptic actuators with a respective one of a plurality of different waveforms.

The controller is used to drive the plurality of haptic actuators with different phase waveforms.

The controller is used to drive the plurality of haptic actuators with different amplitude waveforms.

The controller is used to drive the plurality of haptic actuators with a same waveform.

The controller is used to sense at least one of voltage and current and drive the plurality of haptic actuators based thereon.

An electronic device comprises a device housing, at least one device orientation sensor carried by the device housing, and a plurality of haptic actuators spaced apart within the device housing. The electronic device comprises a controller coupled to the at least one device orientation sensor and the plurality of haptic actuators. The controller is configured to cooperate with the at least one device orientation sensor to determine a sensed orientation of the device, and drive the plurality of haptic actuators to focus a haptic sensation based upon the sensed orientation of the device.

The at least one device orientation sensor comprises at least one accelerometer.

The at least one device orientation sensor comprises a plurality of device orientation sensors.

The controller is configured to drive each of the plurality of haptic actuators with a respective one of a plurality of different waveforms.

The plurality of haptic actuators comprises a pair of opposing haptic actuators.

The plurality of haptic actuators are carried along a periphery of the device housing.

The controller is configured to drive the plurality of haptic actuators with different phase waveforms.

The controller is configured to drive the plurality of haptic actuators with different amplitude waveforms.

The controller is configured to drive the plurality of haptic actuators with a same waveform.

The controller is configured to sense at least one of voltage and current and drive the plurality of haptic actuators based thereon.

Each of the plurality of haptic actuators comprises a haptic actuator housing, a field member movable within the haptic actuator housing, and a coil cooperating with the field member.

An electronic device comprises a device housing, at least one accelerometer carried by the device housing, and a plurality of haptic actuators spaced apart within and carried by a periphery of the device housing. The electronic device comprises a controller coupled to the at least one accelerometer and the plurality of haptic actuators. The controller is configured to cooperate with the at least one accelerometer to determine a sensed orientation of the device, and drive the plurality of haptic actuators to focus a haptic sensation based upon the sensed orientation of the device.

The at least one accelerometer comprises a plurality of accelerometers.

The controller is configured to drive each of the plurality of haptic actuators with a respective one of a plurality of different waveforms.

The controller is configured to drive the plurality of haptic actuators with different phase waveforms.

The controller is configured to drive the plurality of haptic actuators with different amplitude waveforms.

The controller is configured to drive the plurality of haptic actuators with a same waveform.

The controller is configured to sense at least one of voltage and current and drive the plurality of haptic actuators based thereon.

A method of driving a plurality of haptic actuators spaced apart within a device housing of an electronic device comprising at least one device orientation sensor carried by the device housing and a controller coupled to the device orientation sensor and the plurality of haptic actuators comprises using the controller to cooperate with the at least one device orientation sensor to determine a sensed orientation of the device, and drive the plurality of haptic actuators to focus a haptic sensation based upon the sensed orientation of the device.

The at least one device orientation sensor comprises at least one accelerometer.

The at least one device orientation sensor comprises a plurality of device orientation sensors.

The controller is used to drive each of the plurality of haptic actuators with a respective one of a plurality of different waveforms.

The controller is used to drive the plurality of haptic actuators with different phase waveforms.

The controller is used to drive the plurality of haptic actuators with different amplitude waveforms.

The controller is used to drive the plurality of haptic actuators with a same waveform.

The controller is used to sense at least one of voltage and current and drive the plurality of haptic actuators based thereon.

An electronic device comprises a device housing, at least one device proximity sensor carried by the device housing, and a plurality of haptic actuators spaced apart within the device housing. The electronic device comprises a controller coupled to the at least one device proximity sensor and the plurality of haptic actuators. The controller is configured to cooperate with the at least one proximity sensor to determine a sensed proximity of the electronic device to a given object, and drive the plurality of haptic actuators to focus a haptic sensation based upon the sensed proximity of the electronic device to the given object.

The controller is configured to drive each of the plurality of haptic actuators with a respective one of a plurality of different waveforms.

The plurality of haptic actuators comprises a pair of opposing haptic actuators.

The plurality of haptic actuators are carried along a periphery of the device housing.

The controller is configured to drive the plurality of haptic actuators with different phase waveforms.

The controller is configured to drive the plurality of haptic actuators with different amplitude waveforms.

The controller is configured to drive the plurality of haptic actuators with a same waveform.

The controller is configured to sense at least one of voltage and current and drive the plurality of haptic actuators based thereon.

Each of the plurality of haptic actuators comprises a haptic actuator housing, a field member movable within the haptic actuator housing, and a coil cooperating with the field member.

An electronic device comprises a device housing, at least one proximity sensor carried by the device housing, and a plurality of haptic actuators spaced apart within and carried by a periphery of the device housing. The electronic device comprises a controller coupled to the at least one proximity sensor and the plurality of haptic actuators. The controller is configured to cooperate with the at least one proximity detector to determine a sensed proximity of the electronic device to a given object, and drive each of the plurality of haptic actuators with a respective one of a plurality of different waveforms to focus a haptic sensation based upon the sensed proximity of the given object to the electronic device.

The controller is configured to drive the plurality of haptic actuators with different phase waveforms.

The controller is configured to drive the plurality of haptic actuators with different amplitude waveforms.

The controller is configured to drive the plurality of haptic actuators with a same waveform.

The controller is configured to sense at least one of voltage and current and drive the plurality of haptic actuators based thereon.

A method of driving a plurality of haptic actuators spaced apart within a device housing of an electronic device comprising at least one proximity sensor carried by the device housing and a controller coupled to the proximity sensor and the plurality of haptic actuators comprises using the controller to cooperate with the at least one proximity sensor to sense a proximity of a given object to the electronic device, and drive the plurality of haptic actuators to focus a haptic sensation based upon the sensed proximity of the given object to the electronic device.

The controller is used to drive each of the plurality of haptic actuators with a respective one of a plurality of different waveforms.

The controller is used to drive the plurality of haptic actuators with different phase waveforms.

The controller is used to drive the plurality of haptic actuators with different amplitude waveforms.

The controller is used to drive the plurality of haptic actuators with a same waveform.

The controller is used to sense at least one of voltage and current and drive the plurality of haptic actuators based thereon.

That which is claimed is:

1. An electronic device comprising:
a device housing;
wireless communications circuitry carried by the device housing;
a plurality of haptic actuators spaced apart within the device housing, each haptic actuator comprising a coil and a field member movable within the housing responsive to the coil, and each haptic actuator having a respective physical characteristic that changes during aging;
at least one accelerometer carried by the device housing;
a proximity sensor carried by the device housing; and
a controller coupled to the wireless communications circuitry and the plurality of haptic actuators, the controller configured to
sense a back electromotive force (EMF) of respective coils of the plurality of haptic actuators,
determine changes in the respective physical characteristic,
cooperate with the at least one accelerometer to determine sensed motion of the device housing,
cooperate with the proximity sensor to determine relative proximity of the electronic device to a given object,
cooperate with the wireless communications circuitry to receive an electronic message notification from among a plurality of different types of electronic message notifications and determine the type of electronic message notification received, and
drive each of the field members of the plurality of haptic actuators to focus a haptic sensation based upon the type of electronic message notification, changes in the respective physical characteristic, the sensed motion, the relative proximity, and the sensed back EMF.

2. The electronic device of claim 1 wherein the controller is configured to drive each of the plurality of haptic actuators with a respective one of a plurality of different waveforms.

3. The electronic device of claim 1 wherein the plurality of haptic actuators comprises a pair of opposing haptic actuators.

4. The electronic device of claim 1 wherein the plurality of haptic actuators is carried along a periphery of the device housing.

5. The electronic device of claim 1 wherein the controller is configured to drive the plurality of haptic actuators with different phase waveforms.

6. The electronic device of claim 1 wherein the controller is configured to drive the plurality of haptic actuators with different amplitude waveforms.

7. The electronic device of claim 1 wherein the controller is configured to drive the plurality of haptic actuators with a same waveform.

8. The electronic device of claim 1 wherein each of the plurality of haptic actuators further comprises a haptic actuator housing carrying the field member and the coil.

9. The electronic device of claim 1 wherein the plurality of different types of electronic message notifications comprises a plurality of any of an email notification, social media notification, short messaging service (SMS) notification, and voice message notification.

10. An electronic device comprising:
a device housing;
wireless communications circuitry carried by the device housing;
a touch display carried by the device housing and configured to sense an amount of force corresponding to a user input at a location thereon;
a plurality of haptic actuators spaced apart within and carried along a periphery of the device housing, each haptic actuator comprising a coil and a field member movable within the housing responsive to the coil, and each haptic actuator having a respective physical characteristic that changes during aging;
at least one accelerometer carried by the device housing;
a proximity sensor carried by the device housing; and
a controller coupled to the touch display, wireless communications circuitry, and the plurality of haptic actuators, the controller configured to
sense a back electromotive force (EMF) of respective coils of the plurality of haptic actuators,
determine changes in the respective physical characteristic,
cooperate with the at least one accelerometer to determine sensed motion of the device housing,
cooperate with the proximity sensor to determine relative proximity of the electronic device to a given object,
cooperate with the touch display to determine a sensed location of the user input on the touch display,
cooperate with the wireless communications circuitry to receive an electronic message notification from among a plurality of different types of electronic message notifications and determine the type of electronic message notification received, and
drive each of the field members of the plurality of haptic actuators based upon the sensed amount of force to focus a haptic sensation at the sensed location on the touch display and based upon the type of electronic message notification, changes in the respective physical characteristic, the sensed motion, the relative proximity, and the sensed back EMF.

11. The electronic device of claim 10 wherein the controller is configured to drive each of the plurality of haptic actuators with a respective one of a plurality of different waveforms.

12. The electronic device of claim 10 wherein the plurality of haptic actuators comprises a pair of opposing haptic actuators.

13. The electronic device of claim 10 wherein the controller is configured to drive the plurality of haptic actuators with different phase waveforms.

14. The electronic device of claim 10 wherein the controller is configured to drive the plurality of haptic actuators with different amplitude waveforms.

15. The electronic device of claim 10 wherein the controller is configured to drive the plurality of haptic actuators with a same waveform.

16. A method of driving a plurality of haptic actuators spaced apart within a device housing of an electronic device comprising wireless communications circuitry carried by the device housing, each haptic actuator comprising a coil and a field member movable within the housing responsive to the coil, and each haptic actuator having a respective physical characteristic that changes during aging, the method comprising:
using a controller coupled to the touch display and the plurality of haptic actuators to
sense a back electromotive force (EMF) of respective coils of the plurality of haptic actuators,
determine changes in the respective physical characteristic,
cooperate with at least one accelerometer carried by the device housing to determine sensed motion of the device housing,
cooperate with a proximity sensor carried by the device housing to determine relative proximity of the electronic device to a given object,
cooperate with the wireless communications circuitry to receive an electronic message notification from among a plurality of different types of electronic message notifications and determine the type of electronic message notification received, and
drive each of the plurality of haptic actuators to focus a haptic sensation based upon the type of electronic message notification, changes in the respective physical characteristic, the sensed motion, the relative proximity and the sensed back EMF.

17. The method of claim 16 wherein the controller is used to drive each of the plurality of haptic actuators with a respective one of a plurality of different waveforms.

18. The method of claim 16 wherein the controller is used to drive the plurality of haptic actuators with different phase waveforms.

19. The method of claim 16 wherein the controller is used to drive the plurality of haptic actuators with different amplitude waveforms.

20. The method of claim 16 wherein the controller is used to drive the plurality of haptic actuators with a same waveform.

21. The method of claim 16 wherein the plurality of different types of electronic message notifications comprises a plurality of any of an email notification, social media notification, short messaging service (SMS) notification, and voice message notification.

* * * * *